(12) United States Patent
Pepka et al.

(10) Patent No.: US 7,897,249 B2
(45) Date of Patent: Mar. 1, 2011

(54) COMPOSITE MATERIAL STRUCTURE WITH INTERLAYER ELECTRICAL CONDUCTANCE

(75) Inventors: Michael Joseph Pepka, Renton, WA (US); Steven George Lemery, Duvall, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 12/247,131

(22) Filed: Oct. 7, 2008

(65) Prior Publication Data

US 2010/0086764 A1 Apr. 8, 2010

(51) Int. Cl.
*B32B 18/00* (2006.01)

(52) U.S. Cl. ............ 428/299.1; 428/299.4; 361/212; 361/218

(58) Field of Classification Search ............ 428/229.1, 428/229.4; 442/354, 355; 361/212, 218
See application file for complete search history.

(56) References Cited

U.S. PATENT DOCUMENTS

| | | | | | |
|---|---|---|---|---|---|
| 3,572,609 | A | * | 3/1971 | Slawson | 244/1 A |
| 3,684,645 | A | * | 8/1972 | Temple et al. | 428/220 |
| 3,755,713 | A | * | 8/1973 | Paszkowski | 361/218 |
| 3,965,285 | A | * | 6/1976 | Hill | 174/2 |
| 3,989,984 | A | * | 11/1976 | Amason et al. | 361/212 |
| 4,186,237 | A | * | 1/1980 | Propp | 428/323 |
| 4,502,092 | A | * | 2/1985 | Bannink et al. | 361/218 |
| 4,912,594 | A | * | 3/1990 | Bannink et al. | 361/218 |
| 7,307,825 | B2 | * | 12/2007 | De La Fuente De Ana et al. | 361/212 |
| 7,648,759 | B2 | * | 1/2010 | Hirawaki et al. | 428/299.1 |
| 2007/0202762 | A1 | * | 8/2007 | Hirawaki et al. | 442/179 |

* cited by examiner

*Primary Examiner*—N. Edwards
(74) *Attorney, Agent, or Firm*—Tung & Associates

(57) ABSTRACT

A composite material structure includes a first fiber layer, a second fiber layer, a resin layer between the first fiber layer and the second fiber layer and a plurality of chopped fibers provided in the resin layer.

16 Claims, 2 Drawing Sheets

COMPOSITE MATERIAL STRUCTURE WITH INTERLAYER ELECTRICAL CONDUCTANCE

TECHNICAL FIELD

The present disclosure relates to multi-layered or laminated composite material structures. More particularly, the present disclosure relates to a composite material which may have chopped fibers between fiber layers to impart interlayer electrical conductance to the structure.

BACKGROUND

In many applications, it may be desirable to impart electrical conductivity between adjacent fiber layers or plies in a composite structure. Conventional methods of imparting electrical conductivity between adjacent fiber layers may include providing metal elements such as metal wire grids, metal foil or metal sheets between fiber plies in the laminated composite. However, metal elements may possess certain characteristics such as, without limitation, a relatively high coefficient of thermal expansion (CTE) which may render them less suitable for use in structures subject to relatively wide fluctuations in temperature.

Accordingly, there is a need for multi-layered or laminated composite material structures that incorporate chopped fibers between fibers layers to impart interlayer electrical conductance to the structure, and a method for making these structures that overcome the problems discussed above.

SUMMARY

The present disclosure is generally directed to a composite material structure having chopped fibers which may have a relatively low CTE and high corrosion-resistance between fiber layers to impart interlayer electrical conductance to the structure. An illustrative embodiment of the composite material structure includes a first fiber layer, a second fiber layer, a resin layer between the first fiber layer and the second fiber layer and a plurality of chopped fibers provided in the resin layer.

The present disclosure is further generally directed to a method of improving electrical conductivity of a composite material structure. An illustrative embodiment of the method includes providing a resin layer, providing chopped fibers, providing a fiber layer, adding the chopped fibers to the resin layer and pre-impregnating the fiber layer with the resin layer.

BRIEF DESCRIPTION OF THE ILLUSTRATIONS

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. Furthermore, there is no intention to be bound by any expressed or implied theory presented in the preceding technical field, background, brief summary or the following detailed description.

Figure 1:
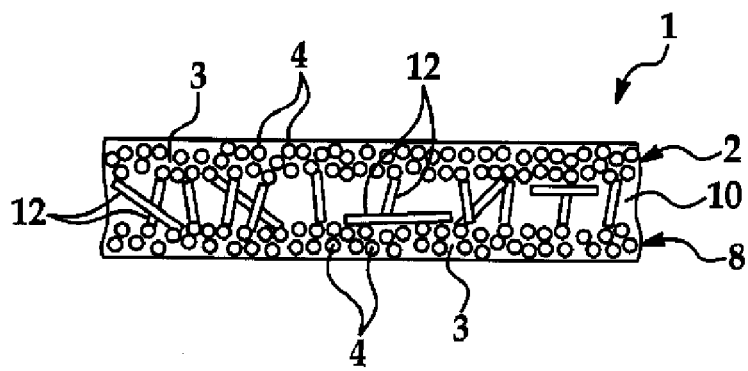
FIG. 1 is a cross-sectional view of an illustrative embodiment of a composite material structure, with chopped fibers provided in a resin layer which extends between first and second fiber layers to impart electrical conductance between the first and second fiber layers.

Referring initially to FIG. 1, an illustrative embodiment of the composite material structure with interlayer electrical conductance, hereinafter composite material structure, is generally indicated by reference numeral 1. The composite material structure 1 may include a first fiber layer 2, a second fiber layer 8 and a resin layer 10 between the first fiber layer 2 and the second fiber layer 8. In some embodiments, the first fiber layer 2 may be the outermost fiber layer and the resin layer 10 may be the outermost resin layer of the composite material structure 1. FIG. 1 (and FIG. 2 herein below) shows the depth of the resin layer 10 in exaggeration for illustrative purposes. In practice, the resin layer 10 may be comparatively thinner than the first fiber layer 2 and/or the second fiber layer 8 (such as 10~60 microns thick, for example and without limitation).

Each of the first fiber layer 2 and the second fiber layer 8 may include a resin matrix 3 which may be epoxy, for example and without limitation. Multiple fibers 4 may extend throughout the resin matrix 3. The fibers 4 may be carbon fibers, for example and without limitation. The fibers 4 may be unidirectional or multi-directional in the resin matrix 3.

Multiple chopped fibers 12 may be provided in the resin layer 10. In some embodiments, the chopped fibers 12 may be carbon, glass, metal and/or ceramic, for example and without limitation. The chopped fibers 12 may generally correspond in length to the thickness of the resin layer 10 and may be from about 10 microns to about 100 microns in length. In some embodiments, the chopped fibers 12 may be about 60 microns in length. The chopped fibers 12 may be present in the resin layer 10 in a quantity of from about 0.1% to about 2% by weight. At least a portion of the chopped fibers 12 establishes electrical conductivity between the first fiber layer 2 and the second fiber layer 8. Therefore, in the event that an electrical current is applied to the first fiber layer 2, such as in the case of a lightening strike, for example and without limitation, the chopped fibers 12 in the resin layer 10 may provide a path of electrical conductivity for the electrical current from the first fiber layer 2 to the second fiber layer 8. The chopped fibers 12 may have a lower coefficient of thermal expansion (CTE) than metals, and may maintain physical and electrical properties under hot and wet conditions. In some methods of fabrication, a plurality of chopped fibers 12 may be provided in a resin 10; the first fiber layer 2 and the second fiber layer 8 may be impregnated with the resin 10; and the first fiber layer 2 and the second fiber layer 8 laid up so that the chopped fibers 12 extend between the first fiber layer 2 and the second fiber layer 8. In some methods of fabrication, the resin layer 10 may be pre-impregnated with the chopped fibers 12 and the resin layer 10 separately applied to the first fiber layer 2 and the second fiber layer 8.

Figure 2:
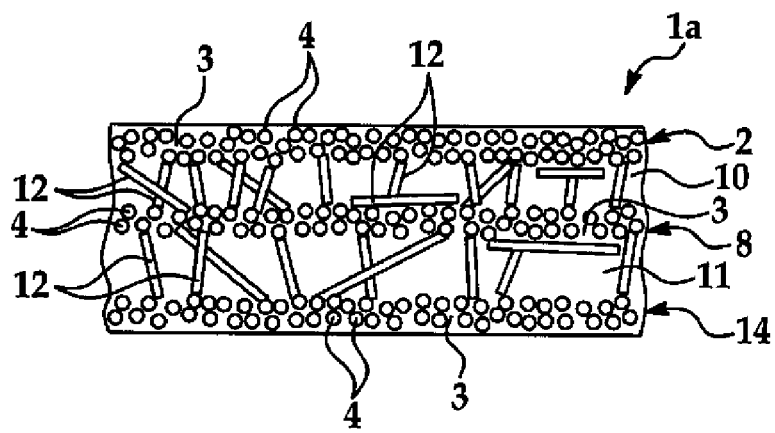
FIG. 2 is a cross-sectional view of an alternative illustrative embodiment of a composite material structure, with chopped fibers provided in a first resin layer between first and second fiber layers and chopped fibers provided in a second resin layer between second and third fiber layers.

Referring next to FIG. 2, in an alternative illustrative embodiment of the composite material structure 1a, a first resin layer 10 having chopped fibers 12 may be provided between a first fiber layer 2 and a second fiber layer 8. A second resin layer 11 having chopped fibers 12 may be provided between the second fiber layer 8 and a third fiber layer 14. The chopped fibers 12 in the first resin layer 10 may provide a path of electrical conductivity from the first fiber layer 2 to the second fiber layer 8. The chopped fibers 12 in the second resin layer 11 may provide a path of electrical conductivity for electrical current from the second fiber layer 8 to the third fiber layer 14. In some embodiments, the first fiber layer 2 may be the outermost fiber layer and the first resin layer 10 may be the outermost resin layer of the composite material structure 1a.

Figure 3:
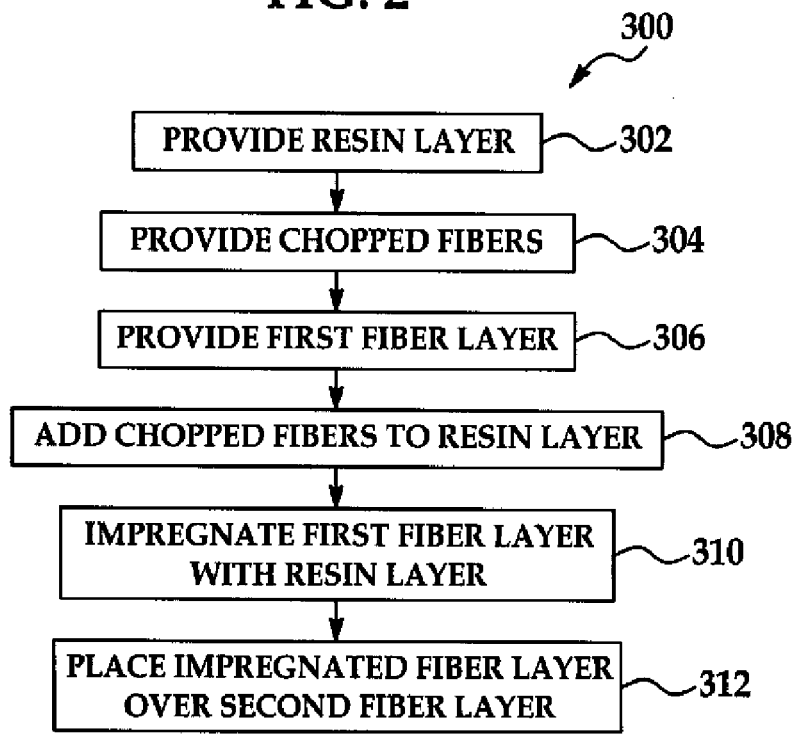
FIG. 3 is a flow diagram of an illustrative embodiment of a method of improving electrical conductivity in a composite material structure.

Referring next to FIG. 3, a flow diagram 300 of an illustrative embodiment of a method of improving electrical conductivity in a composite material structure is shown. In block 302, a resin layer is provided. The resin may be epoxy, for example and without limitation. In block 304, chopped fibers are provided. The chopped fibers may be chopped carbon fibers, for example and without limitation. The length of the chopped fibers may be on the order of from about 10 to about 100 microns or may be on the order of the thickness of the outermost resin layer in the composite material structure. The chopped fibers may be present in the resin layer in a quantity of from about 0.1% to about 2% by weight. In block 306, a first fiber layer is provided. In block 308, the chopped fibers are added to the resin layer. In block 310, the first fiber layer is impregnated with the resin layer having chopped fibers. In block 312, the impregnated fiber layer is placed over a second fiber layer. In some embodiments, the fiber layers of the multi-layered composite structure may be impregnated with chopped fiber-filled resin.

Figure 4:
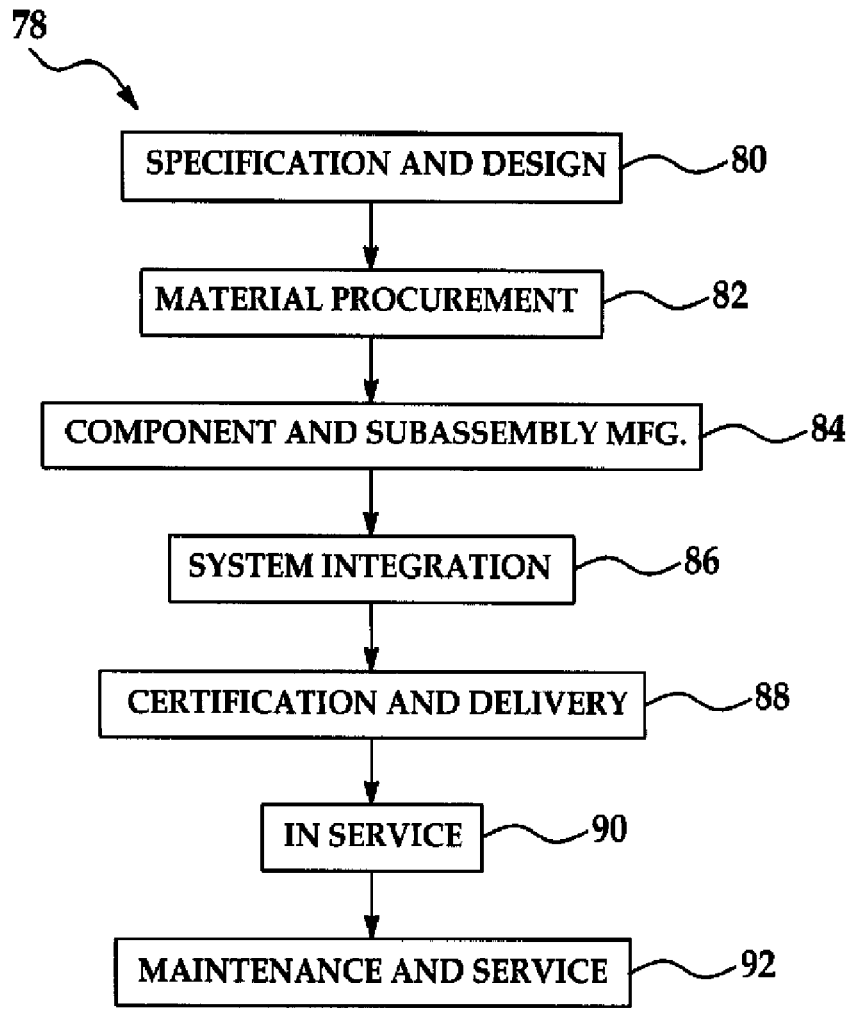
FIG. 4 is a flow diagram of an aircraft production and service methodology.
Figure 5:
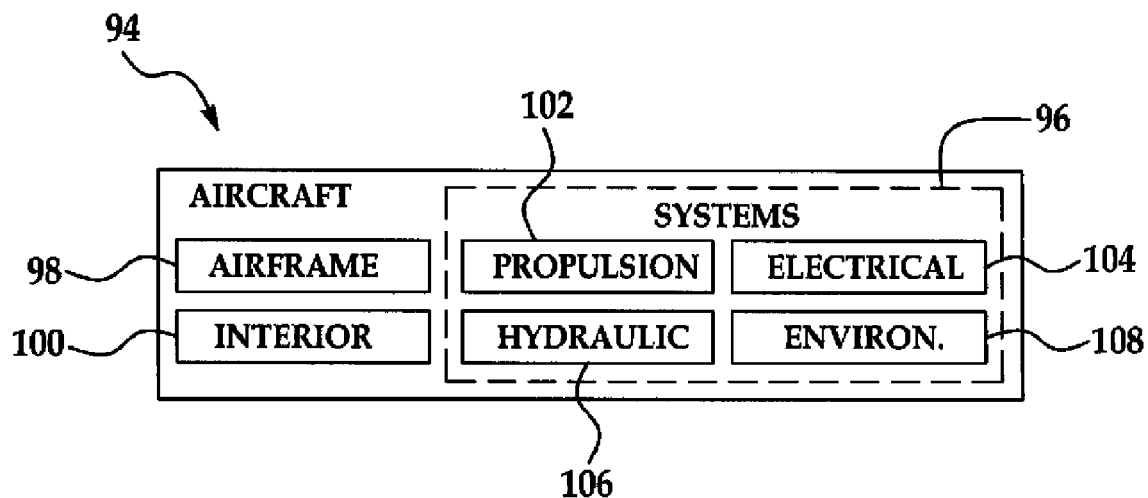
FIG. 5 is a block diagram of an aircraft.

Referring next to FIGS. 4 and 5, embodiments of the disclosure may be used in the context of an aircraft manufacturing and service method 78 as shown in FIG. 4 and an aircraft 94 as shown in FIG. 5. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 5, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite material structure, comprising:
   a first fiber layer;
   a second fiber layer;
   a resin layer between said first fiber layer and said second fiber layer; and
   a plurality of chopped fibers provided in said resin layer, each of said plurality of chopped fibers has a length generally corresponding to a thickness of said resin layer.

2. The composite material structure of claim 1 wherein said first fiber layer is an outermost layer of said composite material structure.

3. The composite material structure of claim 1 wherein said first fiber layer and said second fiber layer are pre-impregnated.

4. The composite material structure of claim 1 wherein said plurality of chopped fibers have a length of from about 10 microns to about 100 microns.

5. The composite material structure of claim 4 wherein said plurality of chopped fibers have a length of about 60 microns.

6. The composite material structure of claim 1 wherein said chopped fibers are present in said resin layer in a quantity of from about 0.1% to about 2% by weight.

7. The composite material structure of claim 1 wherein each of said first fiber layer and said second fiber layer comprises unidirectional fibers.

8. A composite material structure imparting interlayer electrical conductance, comprising:
   a first fiber layer;
   a second fiber layer;
   a resin;
   a plurality of chopped fibers provided in said resin;
   the first and second fiber layers impregnated with the resin; and
   the first and second layers laid up so that the chopped fibers extend between the first and second layers.

9. The composite material structure of claim 8 wherein said first fiber layer is an outermost layer of said composite material structure.

10. The composite material structure of claim 8 wherein said plurality of chopped fibers comprises a plurality of chopped carbon fibers.

11. The composite material structure of claim 8 wherein each of said plurality of chopped fibers has a length generally corresponding to a thickness of said resin.

12. The composite material structure of claim 11 wherein said plurality of chopped fibers have a length of from about 10 microns to about 100 microns.

13. The composite material structure of claim 12 wherein said plurality of chopped fibers have a length of about 60 microns.

14. The composite material structure of claim 8 wherein said chopped fibers are present in said resin layer in a quantity of from about 0.1% to about 2% by weight.

15. The composite material structure of claim 8 wherein each of said first fiber layer and said second fiber layer comprises unidirectional fibers.

16. A composite material structure with interlayer electrical conductance for aircraft fabrication, comprising:

a first fiber layer as an outermost layer of said composite material structure and comprising a resin matrix and unidirectional carbon fibers provided in said resin matrix;

a second fiber layer comprising a resin matrix and unidirectional carbon fibers provided in said resin matrix;

a resin layer having a thickness of about 60 microns between said first fiber layer and said second fiber layer; and a plurality of chopped carbon fibers having a length of from about 60 microns provided in said resin layer and generally corresponding to a thickness of said resin layer in a quantity of from about 0.1% to about 2% by weight and extending between said first fiber layer and said second fiber layer.

* * * * *